(12) United States Patent
Likins

(10) Patent No.: US 12,299,807 B2
(45) Date of Patent: May 13, 2025

(54) MULTI-SENSORY REPRESENTATION OF DATASETS IN A VIRTUAL REALITY ENVIRONMENT

(71) Applicant: RED HAT, INC., Raleigh, NC (US)

(72) Inventor: Gina Likins, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 378 days.

(21) Appl. No.: 17/324,308

(22) Filed: May 19, 2021

(65) Prior Publication Data

US 2022/0375156 A1   Nov. 24, 2022

(51) Int. Cl.
G06T 15/10 (2011.01)
G06T 19/20 (2011.01)

(52) U.S. Cl.
CPC ............. *G06T 15/10* (2013.01); *G06T 19/20* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 8,873,866 B2 | 10/2014 | Cardno | |
| 9,196,169 B2 | 11/2015 | Wallace et al. | |
| 9,665,988 B2 | 5/2017 | Djorgovski et al. | |
| 10,551,993 B1 | 2/2020 | Sanocki et al. | |
| 2012/0324141 A1* | 12/2012 | Seong | G06F 12/0238 711/3 |
| 2017/0092008 A1* | 3/2017 | Djorgovski | G06T 11/206 |
| 2017/0287199 A1* | 10/2017 | Makinen | G06T 17/00 |
| 2018/0025545 A1 | 1/2018 | Tai | |
| 2018/0189990 A1 | 7/2018 | Cardno et al. | |
| 2020/0337650 A1* | 10/2020 | Calhoun | G16H 20/70 |

FOREIGN PATENT DOCUMENTS

WO   2019113299 A1   6/2019

* cited by examiner

*Primary Examiner* — Daniel F Hajnik
*Assistant Examiner* — Jed-Justin Imperial
(74) *Attorney, Agent, or Firm* — Kilpatrick Townsend & Stockton LLP

(57) ABSTRACT

Datasets can be represented in multi-sensory virtual reality environments according to some aspects described herein. For example, a computing system can receive a dataset of previously uncorrelated multivariate data points. Each multivariate data point can include multiple data attributes. The computing system can receive a command specifying associations between the multivariate data points and multi-sensory voxel characteristics. The computing system can generate a three-dimensional virtual reality environment that is comprised of voxels that have multi-sensory voxel characteristics based on the associations and values associated with the data attributes of the multivariate data points. The computing system can then output the three-dimensional virtual reality environment for rendering by a virtual reality subsystem.

17 Claims, 4 Drawing Sheets

---

400

402
Receive a dataset comprising a plurality of previously uncorrelated multivariate data points, each multivariate data point of the plurality of previously uncorrelated multivariate data points having a plurality of data attributes

↓

404
Receive a command specifying associations between the plurality of data attributes and a plurality of multi-sensory voxel characteristics

↓

406
Generate a three-dimensional virtual reality environment comprising a plurality of voxels, each voxel of the plurality of voxels corresponding to a multivariate data point of the plurality of previously uncorrelated multivariate data points and having the plurality of multi-sensory voxel characteristics based on the associations and values associated with the plurality of data attributes for the multivariate data point

↓

408
Output the three-dimensional virtual reality environment for rendering by a virtual reality subsystem

MULTI-SENSORY REPRESENTATION OF DATASETS IN A VIRTUAL REALITY ENVIRONMENT

TECHNICAL FIELD

The present disclosure relates generally to virtual reality environments. More specifically, but not by way of limitation, this disclosure relates to multi-sensory representation of datasets in virtual reality environments.

BACKGROUND

Virtual reality environments can represent objects and other items in three-dimensional space. Virtual reality environments can be displayed to users via headsets and other display devices. Sounds corresponding to the virtual reality environment can be transmitted to the user through virtual reality headsets, headphones, and other auditory devices. Virtual reality controllers can provide haptic feedback corresponding to the virtual reality environment to the user. Through virtual reality headsets, virtual reality controllers, and other devices, users can interact with objects and other items represented in virtual reality environments.

DETAILED DESCRIPTION

Figure 1:
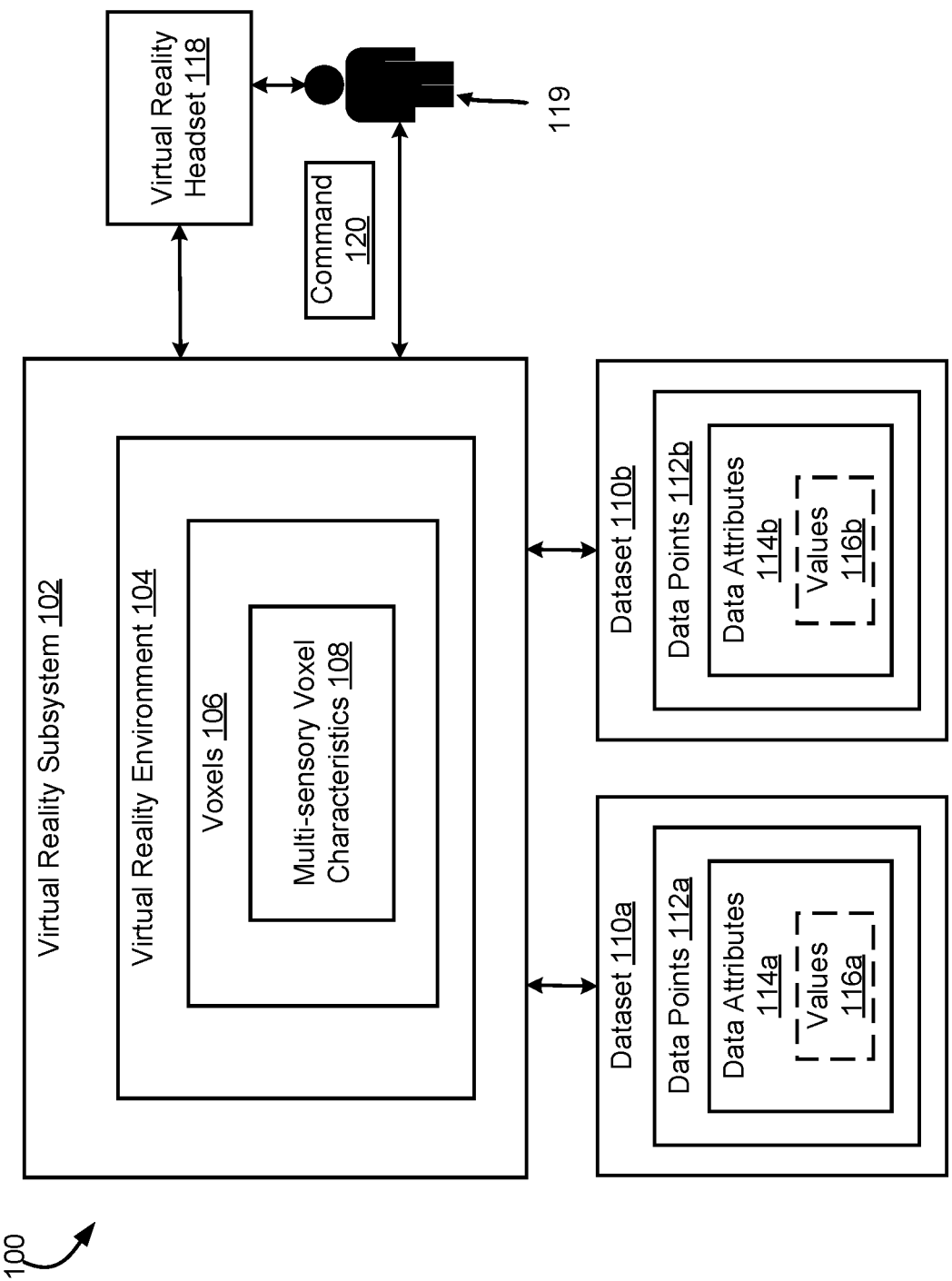
FIG. 1 is a block diagram of an example of a virtual reality system for implementing multi-sensory representation of datasets according to some aspects of the present disclosure.

Innovations in data collection have led to increasingly large and complex datasets. A dataset may be considered complex if it contains a large amount of data, comes from multiple disparate sources, or has a large amount of attributes. The increasing size and complexity of datasets can cause difficulties in data exploration for even skilled statisticians. Datasets may contain interesting or useful data relationships and implications that may be difficult or even impossible to determine due to the limitations of traditional data exploration techniques. An example of the limitations includes the difficulty to identify correlations without prior knowledge of potential correlations in the dataset. Exploratory data analysis tools are often specialized towards specific fields (e.g., biomedicine), may be unable to analyze multi-valued data relationships, and may be unlikely to detect atypical correlations. Artificial intelligence and machine learning models may involve a need for highly correlated features to train the models to detect patterns in large, complex datasets. If the features of the dataset are unknown, it may be difficult to determine how to train the model to detect unknown correlations.

Regardless of the data exploration method, each approach may involve use of a highly skilled data scientist to conduct an analysis, either because software used for data exploration can be complex and require special training, or because awareness of potential correlations can be necessary to formulate meaningful queries. This can be expensive and can limit the potential for having the widest range of perspectives applied to the search for previously unknown correlations. Additionally, traditional approaches may also be limited to a single sensory modality of vision, or less commonly, sound. As humans are accustomed to integrating input from multiple senses at once to more accurately perceive the environment, it may be limiting to restrict analysis to a single sensory modality.

Some examples of the present disclosure can overcome one or more of the abovementioned problems by providing a system that generates a virtual reality environment that represents a dataset. Previously uncorrelated, multivariate data points in the dataset can be represented in a three-dimensional virtual reality environment as individual voxels. Previously uncorrelated data can refer to data for which relationships between attributes of the data have not yet been discovered. Multivariate data points can contain one or more data attributes associated with each data point. For example, a data point representing a hospital patient could have data attributes representing the hospital patient's age, height, and length of stay. Correlations between these attributes for hospital patients may not have been previously explored or determined, and thus the data points can be considered previously uncorrelated.

Each data point can be represented by a voxel in a three dimensional environment, such as a three-dimensional virtual reality environment. Each data attribute of the data point can be represented by a sensory characteristic of the voxel that can be experienced by the user. For example, the first data attribute of age may be represented as a vertical location of the voxel in the three-dimensional virtual reality environment, the second data attribute of height may be presented as a volume level of the voxel, and the third data attribute of length of stay may be represented as a color of the voxel. Thus, a multivariate data point can be experienced by the user via multiple senses.

In some examples, the multi-sensory characteristics can be output to the user to be perceived using the senses of sight, touch, and hearing. Other multi-sensory characteristics output by a virtual reality system may be possible. The multi-sensory characteristics may be output to the user via a headset or one or more controllers. The multi-sensory characteristic for each data attribute may be preset, randomly assigned, or chosen by the user. The user may "walk" or "move" through the dataset in the virtual reality environment and may interact with the data points. In some examples, the user may select, reorganize, or otherwise manipulate the data points using the headset and/or the one or more controllers.

Presenting datasets in a virtual reality environment with randomized multi-sensory characteristics representing data attributes of data points, with the ability to manipulate the data points, can allow for an untrained person (e.g., a person not skilled in data analysis) to detect correlations or patterns in the dataset. Perceiving data with multiple senses may also provide a user with a greater ability to detect correlations or patterns due to the greater variety of sensory input. Additionally, since each data point can be represented by a single voxel, the computation requirements of the virtual reality system may be reduced compared to other virtual reality environments.

To illustrate, a dataset comprising data points representing Americans who were admitted to a hospital for a heart attack during a particular year can have data attributes representing each patient's height, dominant hand, presence of colorblindness, number of broken bones, age, and gender. A three-dimensional virtual reality environment comprising voxels, each of which represents data associated with a single hospital patient, can be generated. The multi-sensory characteristics of each voxel can be associated with each data attribute. For example, patient height can be associated with voxel brightness, with shorter patients having dimmer voxels and taller patients having brighter voxels. The patient's dominant hand can be associated with voxel pitch, with right-handed patients having a high pitch and left-handed patients having a low pitch. The patient's colorblindness status can be associated with voxel color, with red voxels representing patients with red/blue colorblindness, green voxels representing green/blue colorblindness, and white voxels representing an absence of colorblindness. The patient's number of broken bones can be associated with haptic feedback vibrations, with stronger vibrations representing more broken bones and weaker vibrations representing less broken bones. The patient's age can be associated with heat, with higher temperatures representing older patients and lower temperatures representing younger patients. The patient's gender can be associated with vertical location of the voxel in the virtual reality environment, with voxels that are higher in the virtual reality environment indicating male patients and voxels that are lower in the virtual reality environment indicating female patients. A user can experience the three-dimensional virtual reality environment and identify correlations or patterns between data attributes. Due to the multi-sensory representation of data attributes, the user may identify patterns or correlations in the dataset that may not have been previously apparent. For example, the user may notice a correlation between handedness and broken bones in the heart attack hospital patients. Interacting with the data by changing axes, re-associating multi-sensory characteristics and data attributes, and moving the data around in the virtual reality environment can aid in the data exploration.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a virtual reality system 100 for implementing multi-sensory representation of datasets according to some aspects of the present disclosure. The virtual reality system 100 can include a virtual reality subsystem 102 that can display a first dataset 110a and a second dataset 110b in a virtual reality environment 104. The first dataset 110a and the second dataset 110b can be displayed to a user 119 using a virtual reality headset 118 that is communicatively coupled to the virtual reality subsystem 102.

In some examples, the virtual reality subsystem 102 can render the virtual reality environment 104. In some examples, the virtual reality environment 104 can be three dimensional. The virtual reality environment 104 may include voxels 106, and each voxel can include one or more multi-sensory voxel characteristics 108. In some examples, the multi-sensory voxel characteristics 108 can include vertical location within the virtual reality environment 104, volume, color, pitch, timbre, pressure, force, temperature, position, brightness, or scent. The multi-sensory voxel characteristics 108 can be represented visually, aurally, or through heat or pressure outputted by the virtual reality subsystem 102 to the virtual reality headset 118, and then to the user 119.

The virtual reality subsystem 102 can receive the first dataset 110a that includes one or more data points 112a. Each data point 112a can include one or more data attributes 114a, with each data attribute 114a having a value 116a. The data points 112a can be previously uncorrelated multivariate data points, meaning relationships between the data attributes 114a of the data points 112a have not been previously determined. The data points 112a in the first dataset 110a can be represented in the virtual reality environment 104 as voxels 106. For example, the first dataset 110a of pet information can include data points 112a for each pet with data attributes 114a describing breed, age, and weight. Examples of values 116a of data attributes 114a can include dog for the type of animal and sixty pounds for the weight of the pet. In some examples, each multi-sensory voxel characteristic 108 of each voxel 106 can include a characteristic intensity. The characteristic intensity can be associated with a value 116 of a data attribute 114 corresponding to the data point 112 associated with each voxel 106. For example, the data point 112a for a dog could be associated with a voxel 106 with a multi-sensory voxel characteristic 108 of volume, and the characteristic intensity could be a sound played at 60 decibels.

Similarly, the data attributes 114a of the data points 112a can be associated with the multi-sensory voxel characteristics 108. In some examples, the associations can be predetermined, randomly assigned by the virtual reality subsystem 102, or chosen by the user 119. For example, the data attribute 114a describing weight can be randomly assigned to be associated with the vertical location of a voxel 106 within the virtual reality environment 104. Alternatively, the user 119 can select an association within the virtual reality environment 104 for the data attribute 114a from a list of multi-sensory voxel characteristics 108. The list can include vertical location, temperature, volume, pitch, etc. of the voxel 106. In some examples, the user 119 can select the association by sending a command 316 to the virtual reality subsystem 102.

The user 119 can interact with or manipulate the voxels 106 in the virtual reality environment 104 by sending commands 120 to the virtual reality subsystem 102. In some examples, the user 119 can use a controller to select voxels 106 and move them to a different location in the virtual reality environment 104. The controller can send a command 120 to the virtual reality subsystem 102 that can cause the virtual reality subsystem 102 to move the voxels 106 according to the user's 119 input. Alternatively, the user 119 can view different areas of the virtual reality environment 104 by moving the virtual reality headset 118. The virtual reality headset 118 can send a command 120 to the virtual reality subsystem 102 that can cause the virtual reality subsystem 102 to move the orientation of the virtual reality environment 104 with respect to the user 119.

In some examples, the virtual reality subsystem 102 can receive a command 120 specifying manipulation of a presentation axis for the voxels 106. The presentation axis can be an axis corresponding to one of the data attributes 114a. For example, the presentation axis may initially correspond to weight, and the command 120 can specify the presentation axis of the voxels to be age. The virtual reality subsystem 102 can then rearrange the voxels 106 to display the voxels 106 according to the new presentation axis in the virtual reality environment 104. The command 120 can be received from a user 119 interacting with the virtual reality environment 104. Alternatively, the command 120 can be received from within the virtual reality environment 104. The user 119 can send the command 120 specifying the manipulation using the virtual reality headset 118. In some examples, the user 119 can send input specifying the manipulation using controllers or other devices communicatively connected to the virtual reality subsystem 102. The ability to manipulate presentation axes of datasets 110 may allow for greater control and understanding of the datasets 110 when performing statistical analysis.

In some examples, multiple datasets may be viewed and interacted with by the user 119 in the same virtual reality environment 104. For example, the virtual reality subsystem 102 can also receive the second dataset 110b that includes one or more data points 112b with one or more data attributes 114b that have a value 116b. A first subset of the multi-sensory voxel characteristics 108 (e.g., color, volume, and heat) can be associated with the first dataset 110a, and a second subset of the multi-sensory voxel characteristics 108 (e.g., brightness, pitch, and vertical location) can be associated with the second dataset 110b. The first dataset 110a and the second dataset 110b can be simultaneously displayed in the virtual reality environment 104 to allow the user 119 to explore relationships between the first dataset 110a and the second dataset 110b.

FIG. 1 is illustrative and non-limiting. Other examples may include more components, fewer components, different components, or a different arrangement of the components shown in FIG. 1. For example, although the virtual reality system 100 includes two datasets in the example of FIG. 1, the virtual reality system 100 may include a smaller or larger number of datasets in other examples. Additionally, some examples may include a controller in communication with the virtual reality subsystem 102 and the virtual reality environment 104 for receiving input from the user 119 and for producing sensory output to the user 119.

Figure 2:
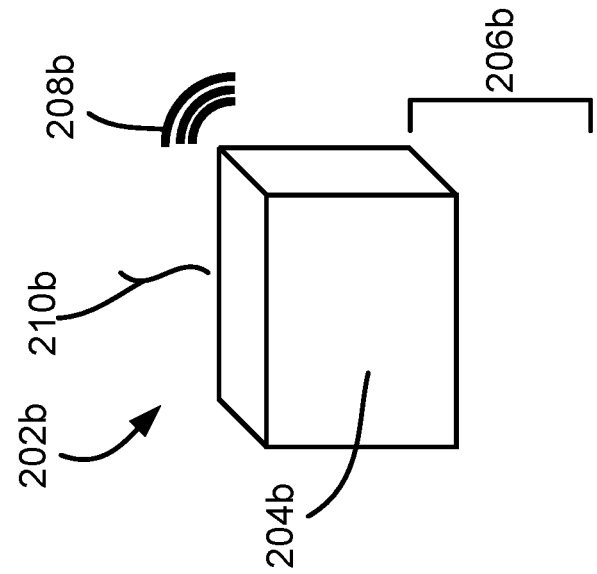
FIG. 2 is a block diagram of an example of voxels having multi-sensory characteristics in a virtual reality environment according to some aspects of the present disclosure.
Figure 2:
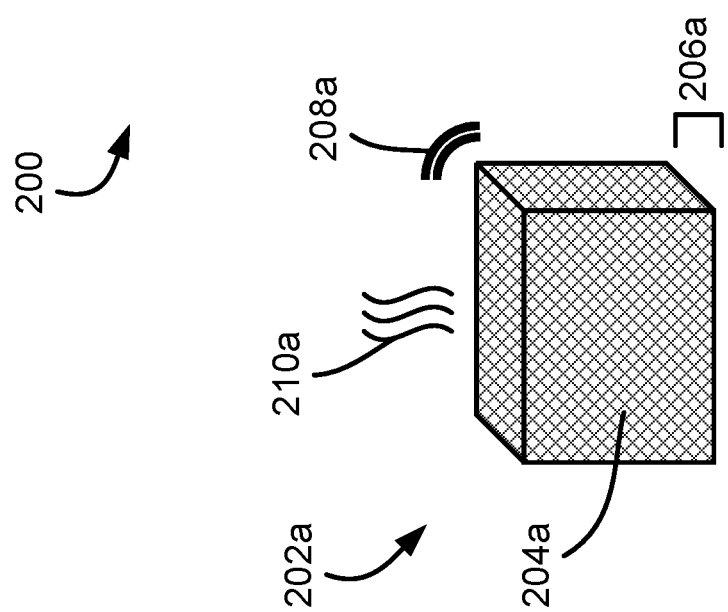

FIG. 2 is a block diagram of an example of voxels having multi-sensory characteristics in a virtual reality environment 200 according to some aspects of the present disclosure. The virtual reality environment includes a first voxel 202a and a second voxel 202b. The multi-sensory characteristics can include color 204, vertical location 206 within the virtual reality environment 200, volume 208, and heat 210. The first voxel 202a can have a darker color 204a, a lower vertical location 206a, a quieter volume 208a, and a stronger heat 210a. The second voxel 202b can have a lighter color 204b, a higher vertical location 206b, a louder volume 208b, and a weaker heat 210b. Using the pet information dataset example from FIG. 1, the multi-sensory characteristics of the first voxel 202a can be associated with data attributes of a data point for a cat. Values of the data attributes may be represented differently by the same multi-sensory characteristics. For example, the darker color 204a can represent the type of animal, with lighter colors representing dogs and darker colors representing cats. The lower vertical location 206a can represent the age of the animal, with lower vertical locations representing younger animals and taller vertical locations representing taller animals. The quieter volume 208a can represent the weight of the animal, with quieter volumes representing lower weights and louder volumes representing higher weights. The stronger heat 210a can represent the animal's chip status, with stronger heat output if the animal is chipped and lower heat output if the animal is not chipped. Similarly, the multi-sensory characteristics of the second voxel 202b can be associated with data attributes of a data point for a dog. The lighter color 204b can represent that the type of animal is dog, the higher vertical location 206b can represent the taller height of the dog, the louder volume 208b can represent the higher weight of the dog, and the weaker heat 210b can represent that the dog is not chipped.

The multi-sensory characteristics can be output to a user via various devices. These devices can include a virtual reality headset, headphones, and controllers. Visual multi-sensory characteristics such as color 204 and vertical location 206 can be output to the user via a virtual reality headset display. Audible multi-sensory characteristics such as volume 208 can be output to the user via speakers in the virtual reality headset, headphones, or controllers. Tactile multi-sensory characteristics such as heat 210 or vibration can be output to the user via haptic feedback components in the virtual reality headset or controllers. In some examples, other multi-sensory characteristics can be output to the user by some combination of headset, headphones, controllers, and other devices communicatively connected to the three-dimensional virtual reality environment.

Figure 3:
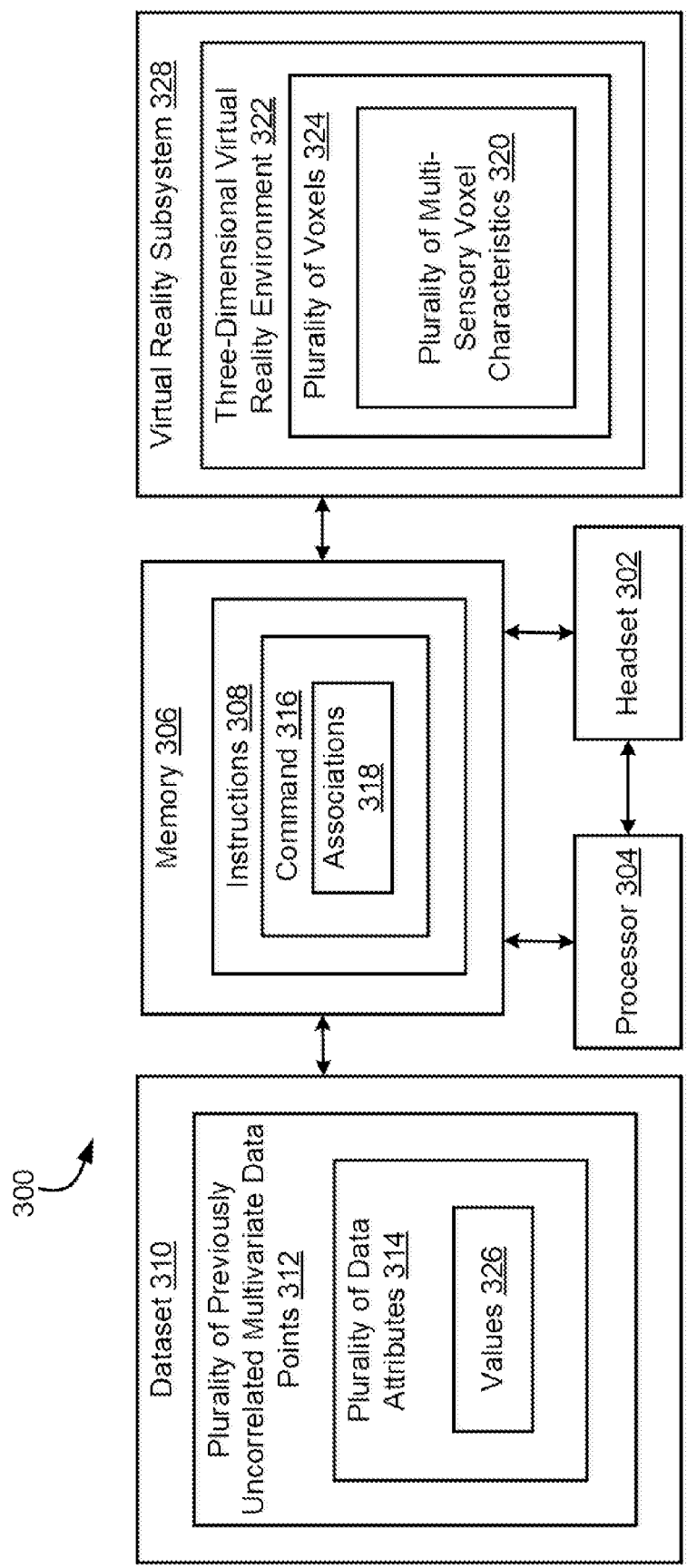
FIG. 3 is a block diagram of a computing system for implementing multi-sensory representation of datasets according to some aspects of the present disclosure.

FIG. 3 is a block diagram of a computing system 300 for implementing multi-sensory representation of datasets according to some aspects of the present disclosure. The computing system 300 includes a headset 302 that is communicatively coupled to a processor 304 and a memory 306. The memory 306 is communicatively coupled to the processor 304 and is also communicatively coupled with a dataset 310 and a virtual reality subsystem 328. The processor 304 may be part of a virtual reality subsystem, such as the virtual reality subsystem 102 in FIG. 1 or the virtual reality subsystem 328 in FIG. 3.

The processor 304 can include one processor or multiple processors. Non-limiting examples of the processor 304 include a Field-Programmable Gate Array (FPGA), an application-specific integrated circuit (ASIC), a microprocessor, etc. The processor 304 can execute instructions 308 stored in the memory 306 to perform operations. The instructions 308 may include processor-specific instructions generated by a compiler or an interpreter from code written in any suitable computer-programming language, such as C, C++, C#, etc.

The memory 306 can include one memory or multiple memories. The memory 306 can be non-volatile and may include any type of memory that retains stored information when powered off. Non-limiting examples of the memory 306 include electrically erasable and programmable read-only memory (EEPROM), flash memory, or any other type of non-volatile memory. At least some of the memory 306 can include a non-transitory computer-readable medium from which the processor 304 can read instructions 308. A computer-readable medium can include electronic, optical, magnetic, or other storage devices capable of providing the processor 304 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 308.

In some examples, the processor 304 can execute the instructions 308 to perform operations. For example, the processor 304 can receive the dataset 310 that includes a plurality of previously uncorrelated multivariate data points 312. Each multivariate data point of the plurality of previously uncorrelated multivariate data points 312 can include a plurality of data attributes 314. Each data attribute of the plurality of data attributes 314 can include a value 326. The processor 304 can receive a command 316 specifying associations between the plurality of data attributes 314 and a plurality of multi-sensory voxel characteristics 320. The processor 304 can then generate a three-dimensional virtual reality environment 322. The three-dimensional virtual reality environment 322 can include a plurality of voxels 324, where each voxel of the plurality of voxels 324 includes the plurality of multi-sensory voxel characteristics 320. Each voxel of the plurality of voxels 324 can correspond to a multivariate data point of the plurality of previously uncorrelated multivariate data points 312. The plurality of multi-sensory voxel characteristics 320 of each voxel can correspond with the plurality of data attributes 314 and their values 326 according to the associations 318. The processor 304 can output the three-dimensional virtual reality environment 322 for rendering by the virtual reality subsystem 328. The three-dimensional virtual reality environment 322 can then be explored and interacted with by a user. This may allow for easier and simplified exploration of complex datasets, resulting in discovery of previously undiscovered correlations between data attributes. In some examples, the computing system 300 can include haptic feedback devices (e.g., controllers) communicatively coupled to the processor 304. The haptic feedback devices can provide haptic feedback associated the multi-sensory voxel characteristics 320 within the virtual reality environment 104 to a user.

Figure 4:
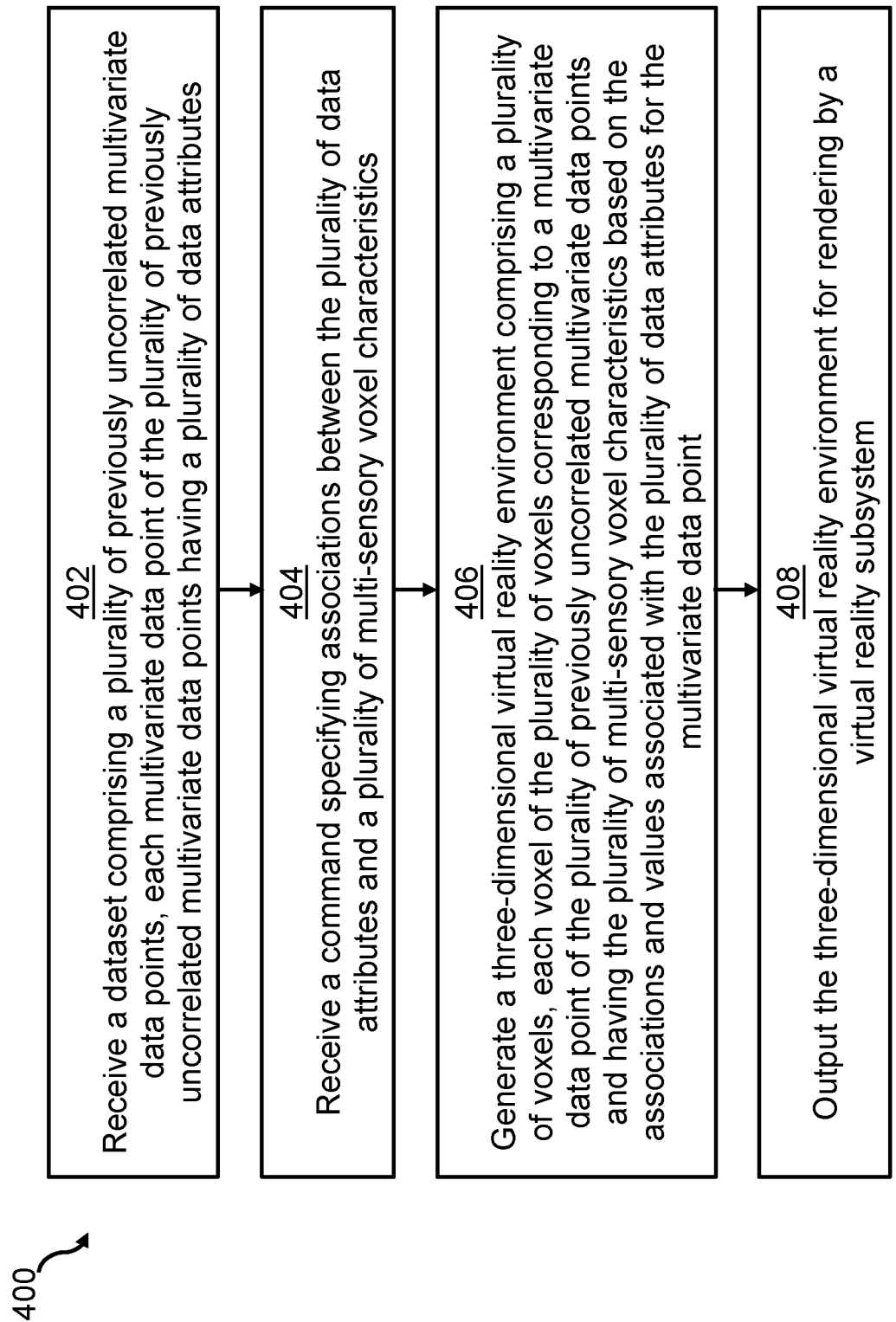
FIG. 4 is a flowchart of a process for implementing multi-sensory representation of datasets in a virtual reality environment according to some aspects of the present disclosure.

The processor 304 can implement some or all of the steps shown in FIG. 4. Other examples can include more steps, fewer steps, different steps, or a different order of the steps than is shown in FIG. 4. The steps of FIG. 4 are discussed below with reference to the components discussed above in relation to FIG. 3.

In block 402, a computing device receives a dataset 310 comprising a plurality of previously uncorrelated multivariate data points 312. Each multivariate data point of the plurality of previously uncorrelated multivariate data points 312 can have a plurality of data attributes 314. In some examples, the computing device may receive multiple datasets 310, each comprising a plurality of previously uncorrelated multivariate data points 312.

In block 404, the computing device receives a command 316 specifying associations 318 between the plurality of data attributes 314 and a plurality of multi-sensory voxel characteristics 320. In some examples, the command 316 can be received from within a three-dimensional virtual reality environment 322 comprising a plurality of voxels 324. Alternatively, the command 316 can be received prior to generating a three-dimensional virtual reality environment 322.

In block 406, the computing device generates the three-dimensional virtual reality environment 322 including a plurality of voxels 324. Each voxel of the plurality of voxels 324 can correspond to a multivariate data point of the plurality of previously uncorrelated multivariate data points 312. Each voxel of the plurality of voxels 324 can include a plurality of multi-sensory voxel characteristics 320 that are based on the associations 318 and values 326 associated with the plurality of data attributes 314 for the multivariate data point 312.

In block 408, the computing device outputs the three-dimensional virtual reality environment 322 for rendering by a virtual reality subsystem 328. In some examples, the display can be outputted to a headset 302. Alternatively, the display can be outputted to any suitable display device. Outputting the three-dimensional virtual reality environment 322 for display can include outputting visual displays, sounds, vibrations, heat, and smells to a user. The user may perform statistical analysis on the dataset using the multi-sensory voxel characteristics 320.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

What is claimed is:

1. A system comprising:
a headset communicatively coupled to a processor; and
a memory including instructions that are executable by the processor for causing the processor to:
receive a dataset comprising a plurality of previously uncorrelated multivariate data points, each multivariate data point of the plurality of previously uncorrelated multivariate data points having a plurality of data attributes;
prior to generating a three-dimensional virtual reality environment, generate a randomized association between each data attribute of the plurality of data attributes and a multi-sensory voxel characteristic of a plurality of multi-sensory voxel characteristics;
generate the three-dimensional virtual reality environment comprising a plurality of voxels, each voxel of the plurality of voxels corresponding to a multivariate data point of the plurality of previously uncorrelated multivariate data points and having the plurality of multi-sensory voxel characteristics based on the randomized associations and values associated with the plurality of data attributes for the multivariate data point;
output the three-dimensional virtual reality environment for rendering by a virtual reality subsystem;
subsequent to outputting the three-dimensional virtual reality environment for rendering, receive a command from within the three-dimensional virtual reality environment reassigning at least one data attribute to be associated with another multi-sensory voxel characteristic that differs from the randomized association; and
in response to receiving the command, regenerate the rendering of the plurality of voxels in the three-dimensional virtual reality environment based on the reassigning of the at least one data attribute to be associated with the other multi-sensory voxel characteristic.

2. The system of claim 1, wherein the memory further includes instructions that are executable by the processor for causing the processor to:
prior to generating the three-dimensional virtual reality environment, receive a command specifying associations between the plurality of data attributes and the plurality of multi-sensory voxel characteristics external to the three-dimensional virtual reality environment.

3. The system of claim 1, wherein the memory further includes instructions that are executable by the processor for causing the processor to:
receive input specifying a manipulation of a presentation axis for the plurality of voxels, the presentation axis corresponding to one of the plurality of data attributes; and
in response to receiving the input, rearrange the plurality of voxels within the three-dimensional virtual reality environment based on the manipulation.

4. The system of claim 1, wherein the plurality of multi-sensory voxel characteristics comprises brightness, vertical location, volume, color, pitch, pressure, force, temperature, position, and scent.

5. The system of claim 1, wherein the dataset is a first dataset, the plurality of previously uncorrelated multivariate data points is a first plurality of previously uncorrelated multivariate data points, the plurality of data attributes is a first plurality of data attributes, and the memory further includes instructions that are executable by the processor for causing the processor to:
receive a second dataset comprising a second plurality of previously uncorrelated multivariate data points, each multivariate data point of the second plurality of previously uncorrelated multivariate data points having a second plurality of data attributes;
receive a first command specifying first associations between the first plurality of data attributes and a first subset of the plurality of multi-sensory voxel characteristics;
receive a second command specifying second associations between the second plurality of data attributes and a second subset of the plurality of multi-sensory voxel characteristics;
generate the three-dimensional virtual reality environment comprising the plurality of voxels, each voxel of the plurality of voxels including the first subset of the plurality of multi-sensory voxel characteristics and the second subset of the plurality of multi-sensory voxel characteristics; and
output the three-dimensional virtual reality environment for rendering by the virtual reality subsystem.

6. The system of claim 1, wherein each voxel of the plurality of voxels comprises a plurality of characteristic intensities, each characteristic intensity of the plurality of characteristic intensities being based on a value of the corresponding data attribute of the plurality of data attributes.

7. A non-transitory computer-readable medium comprising program code that is executable by a processor for causing the processor to:
prior to generating a three-dimensional virtual reality environment, generate a randomized association between each data attribute of a plurality of data attributes and a multi-sensory voxel characteristic of a plurality of multi-sensory voxel characteristics;
generate the three-dimensional virtual reality environment comprising:
a plurality of voxels representing a plurality of previously uncorrelated multivariate data points, each data point of the plurality of previously uncorrelated multivariate data points having the plurality of data attributes, wherein each voxel of the plurality of voxels corresponds to a data point of the plurality of previously uncorrelated multivariate data points and comprises the plurality of multi-sensory voxel characteristics based on the randomized associations between the plurality of data attributes and the plurality of multi-sensory voxel characteristics; and
subsequent to generating the three-dimensional virtual reality environment:
receive a command from within the three-dimensional virtual reality environment reassigning at least one data attribute to be associated with another multi-sensory voxel characteristic that differs from the randomized association; and
in response to receiving the command, regenerate the plurality of voxels in the three-dimensional virtual reality environment based on the reassigning of the at least one data attribute to be associated with the other multi-sensory voxel characteristic.

8. The non-transitory computer-readable medium of claim 7, further comprising program code that is executable by the processor for causing the processor to:
receive, in the three-dimensional virtual reality environment, input specifying a manipulation of a presentation axis for the plurality of voxels, the presentation axis corresponding to one of the plurality of data attributes; and
in response to receiving the input, rearrange the plurality of voxels within the three-dimensional virtual reality environment based on the manipulation.

9. The non-transitory computer-readable medium of claim 7, wherein the plurality of previously uncorrelated multivariate data points are previously uncorrelated data points.

10. The non-transitory computer-readable medium of claim 8, wherein the three-dimensional virtual reality environment includes the plurality of voxels having the plurality of multi-sensory voxel characteristics based on a command including specified associations between the plurality of data attributes and the plurality of multi-sensory voxel characteristics, the command being received external to the three-dimensional virtual reality environment prior to generating the three-dimensional virtual reality environment.

11. The non-transitory computer-readable medium of claim 7, wherein the plurality of multi-sensory voxel characteristics comprises brightness, vertical location, volume, color, pitch, pressure, temperature, force, position, and scent.

12. A method comprising:
receiving, by a processor, a dataset comprising a plurality of previously uncorrelated multivariate data points, each multivariate data point of the plurality of previously uncorrelated multivariate data points having a plurality of data attributes;
prior to generating a three-dimensional virtual reality environment, generating, by the processor, a randomized association between each data attribute of the plurality of data attributes and a multi-sensory voxel characteristic of a plurality of multi-sensory voxel characteristics;
generating, by the processor, the three-dimensional virtual reality environment comprising a plurality of voxels, each voxel of the plurality of voxels corresponding to a multivariate data point of the plurality of previously uncorrelated multivariate data points and having the plurality of multi-sensory voxel characteristics based on the randomized associations and values associated with the plurality of data attributes for the multivariate data point;
outputting, by the processor, the three-dimensional virtual reality environment for rendering by a virtual reality subsystem;
subsequent to outputting the three-dimensional virtual reality environment for rendering, receiving, by the processor, a command from within the three-dimensional virtual reality environment reassigning at least one data attribute to be associated with another multi-sensory voxel characteristic that differs from the randomized association; and
in response to receiving the command, regenerating, by the processor, the rendering of the plurality of voxels in the three-dimensional virtual reality environment based on the reassigning of the at least one data attribute to be associated with the other multi-sensory voxel characteristic.

13. The method of claim 12, further comprising:
prior to generating the three-dimensional virtual reality environment, receiving, by the processor, a command specifying associations between the plurality of data attributes and the plurality of multi-sensory voxel characteristics external to the three-dimensional virtual reality environment.

14. The method of claim 12, further comprising:
receiving, by the processor, input specifying a manipulation of a presentation axis for the plurality of voxels, the presentation axis corresponding to one of the plurality of data attributes; and
in response to receiving the input, rearranging, by the processor, the plurality of voxels within the three-dimensional virtual reality environment based on the manipulation.

15. The method of claim 12, wherein the plurality of multi-sensory voxel characteristics comprises brightness, vertical location, volume, color, pitch, pressure, force, temperature, position, and scent.

16. The method of claim 12, wherein the dataset is a first dataset, the plurality of previously uncorrelated multivariate data points is a first plurality of previously uncorrelated multivariate data points, the plurality of data attributes is a first plurality of data attributes, further comprising:
receiving, by the processor, a second dataset comprising a second plurality of previously uncorrelated multivariate data points, each multivariate data point of the second plurality of previously uncorrelated multivariate data points having a second plurality of data attributes;
receiving, by the processor, a first command specifying first associations between the first plurality of data attributes and a first subset of the plurality of multi-sensory voxel characteristics;
receiving, by the processor, a second command specifying second associations between the second plurality of data attributes and a second subset of the plurality of multi-sensory voxel characteristics;
generating, by the processor, the three-dimensional virtual reality environment comprising the plurality of voxels, each voxel of the plurality of voxels including the first subset of the plurality of multi-sensory voxel characteristics and the second subset of the plurality of multi-sensory voxel characteristics; and
outputting, by the processor, the three-dimensional virtual reality environment for rendering by the virtual reality subsystem.

17. The method of claim 12, wherein each voxel of the plurality of voxels comprises a plurality of characteristic intensities, each characteristic intensity of the plurality of characteristic intensities being based on a value of the corresponding data attribute of the plurality of data attributes.

* * * * *